US008135253B2

(12) United States Patent
Smith et al.

(10) Patent No.: US 8,135,253 B2
(45) Date of Patent: Mar. 13, 2012

(54) MICROCHANNEL PLATE (MCP) HAVING AN ASYMMETRIC PACKING PATTERN FOR HIGHER OPEN AREA RATIO (OAR)

(75) Inventors: Arlynn Walter Smith, Blue Ridge, VA (US); Thomas Theodore Mabry, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 511 days.

(21) Appl. No.: 12/357,552

(22) Filed: Jan. 22, 2009

(65) Prior Publication Data

US 2010/0183271 A1 Jul. 22, 2010

(51) Int. Cl.
*G02B 6/04* (2006.01)
*G02B 6/06* (2006.01)

(52) U.S. Cl. ........................................ 385/120; 385/115

(58) Field of Classification Search .................. 385/120, 385/115

See application file for complete search history.

(56) References Cited

U.S. PATENT DOCUMENTS

| | | | | |
|---|---|---|---|---|
| 3,216,807 | A * | 11/1965 | Woodcock | 65/411 |
| 4,385,092 | A | 5/1983 | Singer | |
| 4,912,314 | A | 3/1990 | Sink | |
| 6,183,329 | B1 * | 2/2001 | Cathey et al. | 445/24 |
| 6,243,520 | B1 * | 6/2001 | Goldman | 385/115 |
| 6,928,218 | B2 * | 8/2005 | Nakata et al. | 385/116 |
| 7,126,263 | B2 * | 10/2006 | Peck | 313/103 CM |
| 7,221,837 | B2 * | 5/2007 | Mabry | 385/120 |
| 2005/0000249 | A1 * | 1/2005 | Mabry | 65/409 |
| 2005/0122022 | A1 * | 6/2005 | Smith et al. | 313/103 CM |
| 2006/0045444 | A1 * | 3/2006 | Miller et al. | 385/115 |

FOREIGN PATENT DOCUMENTS

| | | |
|---|---|---|
| EP | 1 804 096 | 7/2007 |
| GB | 2119361 | 11/1983 |
| WO | WO 00/02221 | 1/2000 |

OTHER PUBLICATIONS

European Search Report for Serial No. EP 10 150 901.6-1232, Mailed Jan. 24, 2012, 9 pages.

* cited by examiner

*Primary Examiner* — Rhonda Peace
(74) *Attorney, Agent, or Firm* — RatnerPrestia

(57) ABSTRACT

A boule for making a multichannel plate (MCP) includes (a) at least two sets of rows of fibers, each set arranged to form a hexagonally shaped boundary of fibers, and (b) an additional row of fibers disposed between the two sets of hexagonally shaped boundary of fibers. The additional row of fibers includes a horizontally oriented row of fibers, which is packed on top of a horizontally oriented boundary of fibers. A fiber of the horizontally oriented row of fibers of the boundary is packed adjacent to two consecutive fibers of the additional row of fibers, forming a triangular shape of fibers. The triangular shape of fibers forms a maximum open area ratio (OAR) of at least 90 percent.

17 Claims, 5 Drawing Sheets

MICROCHANNEL PLATE (MCP) HAVING AN ASYMMETRIC PACKING PATTERN FOR HIGHER OPEN AREA RATIO (OAR)

TECHNICAL FIELD

The present invention relates to microchannel plates (MCPs) for use with image intensifiers. More specifically, the present invention relates to a device and method for fabricating MCPs having asymmetric packing patterns that produce a higher open area ratio (OAR).

BACKGROUND OF THE INVENTION

Microchannel plates are used as electron multipliers in image intensifiers. They are thin glass plates having an array of channels extending there through, which are located between a photocathode and a phosphor screen. An incoming electron from the photocathode enters the input side of the microchannel plate and strikes a channel wall. When voltage is applied across the microchannel plate, these incoming or primary electrons are amplified, generating secondary electrons. The secondary electrons then exit the channel at the back end of the microchannel plate and generate an image on the phosphor screen.

In general, fabrication of a microchannel plate starts with a fiber drawing process, as disclosed in U.S. Pat. No. 4,912,314, issued Mar. 27, 1990 to Ronald Sink, which is incorporated herein by reference in its entirety. For convenience, FIGS. 1-4, disclosed in U.S. Pat. No. 4,912,314, are included herein and discussed below.

FIG. 1 shows a starting fiber 10 for the microchannel plate. Fiber 10 includes glass core 12 and glass cladding 14 surrounding the core. Core 12 is made of glass material that is etchable in an appropriate etching solution. Glass cladding 14 is made from glass material which has a softening temperature substantially the same as the glass core. The glass material of cladding 14 is different from that of core 12, however, in that it has a higher lead content, which renders the cladding non-etchable under the same conditions used for etching the core material. Thus, cladding 14 remains after the etching of the glass core. A suitable cladding glass is a lead-type glass, such as Corning Glass 8161.

The optical fibers are formed in the following manner: An etchable glass rod and a cladding tube coaxially surrounding the rod are suspended vertically in a draw machine which incorporates a zone furnace. The temperature of the furnace is elevated to the softening temperature of the glass. The rod and tube fuse together and then are drawn into a single fiber 10. Fiber 10 is fed into a traction mechanism, in which the speed is adjusted until the desired fiber diameter is achieved. Fiber 10 is then cut into shorter lengths of approximately 18 inches.

Several thousands of the cut lengths of single fiber 10 are then stacked into a graphite mold and heated at a softening temperature of the glass to form hexagonal array 16, as shown in FIG. 2. As shown, each of the cut lengths of fiber 10 has a hexagonal configuration. The hexagonal configuration provides a better stacking arrangement.

The hexagonal array, which is also known as a multi assembly or a bundle, includes several thousand single fibers 10, each having core 12 and cladding 14. Bundle 16 is suspended vertically in a draw machine and drawn to again decrease the fiber diameter, while still maintaining the hexagonal configuration of the individual fibers. Bundle 16 is then cut into shorter lengths of approximately 6 inches.

Several hundred of the cut bundles 16 are packed into a precision inner diameter bore glass tube 22, as shown in FIG. 3. The glass tube is made of a glass material similar to glass cladding 14 but is non-etchable by the etching process used to etch glass core 12. The outer glass tube 22 eventually becomes a solid rim border of the microchannel plate.

In order to protect fibers 10 of each bundle 16, during processing to form the microchannel plate, several support structures are positioned in glass tube 22 to replace those bundles 16 which form the outer layer of the assembly. The support structures may take the form of hexagonal rods of any material having the necessary strength and the capability to fuse with the glass fibers. Each support structure may be a single optical glass fiber 24 having a hexagonal shape and a cross-sectional area approximately as large as that of one of the bundles 16. The single optical glass fiber, however, has a core and a cladding which are both non-etchable. The optical fibers 24, or support rods 24, are illustrated in FIG. 3, as disposed at the periphery of assembly 30 surrounding the many bundles 16.

The support rods may be formed from one optical fiber or any number of fibers up to several hundred. The final geometric configuration and outside diameter of one support rod 24 is substantially the same as one bundle 16. The multiple fiber support rods may be formed in a manner similar to that of forming bundle 16.

Each bundle 16 that forms the outermost layer of fibers in tube 22 is replaced by a support rod 24. This is preferably done by positioning one end of a support rod 24 against one end of a bundle 16 and then pushing support rod 24 against bundle 16, until bundle 16 is out of tube 22. The assembly formed when all of the outer bundles 16 have been replaced by support rods 24 is called a boule, and is generally designated as 30 in FIG. 3.

Boule 30 is fused together in a heating process to produce a solid boule of rim glass and fiber optics. The fused boule is then sliced, or diced, into thin cross-sectional plates or wafers. The wafers are ground and polished.

In order to form the microchannels, cores 12 of optical fibers 10 are removed, by etching with dilute hydrochloric acid. After etching the boule, the high lead content glass cladding 14 remains to form microchannels 32, as illustrated in FIG. 4. Also, support rods 24 remain solid and provide a good transition from the solid rim of tube 22 to microchannels 32.

Additional process steps include beveling and polishing of the glass boule. After the plates are etched to remove the core rods, the channels in the boule are metalized and activated.

In the fabrication of a microchannel plate, the core/clad rods are typically stacked into a symmetric hexagonal shape, as described above with respect to FIG. 2 and shown as a top view in FIG. 5A. In the interior of bundle 16, each core/clad rod 10 is represented by a circle, designated as 10. The circles are tightly packed into a hexagonal shape.

If each circle in FIG. 5A represents a core/clad pair, then broken channel walls may occur when the clad walls etch out and the circles touch each other. The maximum possible open area ratio (OAR), just before this break through, may be calculated, using the geometry shown in FIG. 5B, where r is the radius of circle 10, as follows:

$$\text{Channel area} = \Pi r^2/2$$

$$\text{Dashed area} = 2\left(\frac{1}{2}\sqrt{3}\,r^2\right)$$

$$\text{Area ratio} = \Pi r^2/2\sqrt{3}\,r^2 = \Pi/3.46$$

$$\text{Maximum } OAR = 90.69\%$$

As bundles 16 are stacked to form a boule, for example boule 30, multiple hexagonal shaped bundles 16 (FIG. 5A) are stacked and pressed together to form multiboundary regions, as shown in FIG. 6A. These multiboundary regions are designated as 60.

Upon careful examination of FIG. 6A, it may be observed that multiboundary regions 60 are easily differentiated from the interior of each hexagonal multifiber, or bundle 16. At the interface between each bundle, fibers 10 are packed in a square pack arrangement. The maximum OAR for the square pack arrangement may be calculated using the geometric relationship shown in FIG. 6B, where r is the radius of circle 10, as follows:

$$\text{Channel area}=\Pi r^2$$

$$\text{Dashed area}=(2r)^2$$

$$\text{Area ratio}=\Pi r^2/(4r^2)=\Pi/4$$

$$\text{Maximum OAR}=78.5\%$$

It will be appreciated that there is a large difference in the maximum OAR achievable between the packing of rows in hexagonal array 16 (FIG. 5A) and the packing of a square array of rows at multiboundary regions 60 (FIG. 6A). The former achieves a maximum OAR of 90.7% and the latter achieves only a maximum OAR of 78.5%.

Since there must be a safety margin of achievable OAR (material is needed at the interface between each fiber), current boules are formed to achieve 63% OAR. In addition, there may be the occurrence of broken channel walls.

The present invention, as will be described, provides a method of stacking the bundles, so that the square packs of rows at the multiboundary regions of the boule are minimized or eliminated. This, in turn, increases the OAR during the boule fabrication. The present invention provides a boule which continues the hexagonal close packing of rows across the multiboundary regions. In addition, advantageously, the bundles need not be shifted by half a channel, one bundle to an adjacent bundle. The present invention is described below.

SUMMARY OF THE INVENTION

To meet this and other needs, and in view of its purposes, the present invention provides a structure for a microchannel plate (MCP). The structure includes a plurality of multifibers, each multifiber having rows of fibers arranged in a symmetrical hexagonal configuration, where each hexagonal configuration has a boundary. Single rows of fibers, in addition to the plurality of multifibers, are added along respective boundaries of the multifibers.

A multifiber and a single row of fibers that is disposed along a respective multifiber form an asymmetrical hexagonal arrangement of fibers. Each multifiber includes a first row of fibers packed along a second row of fibers, in which a fiber of the first row is packed adjacent to two fibers of the second row, thereby forming a triangular shape of fibers. Each multifiber includes a row of boundary fibers forming a respective boundary, and a fiber of a single row of fibers is packed adjacent to two fibers of the boundary fibers, forming a triangular shape of fibers. The triangular shape of fibers forms a maximum open area ratio (OAR) of at least 90 percent.

The rows of fibers include core fibers and cladding fibers, where the cladding fibers surround the core fibers. The single rows of fibers and the multifibers are configured to form a boule, and the boule is configured for dicing during fabrication of the MCP.

Another embodiment of the present invention includes a boule for making a multichannel plate (MCP). The boule includes at least two sets of rows of fibers, each set arranged to form a hexagonally shaped boundary of fibers, and an additional row of fibers is disposed between the two sets of hexagonally shaped boundary of fibers. Each set includes a horizontally oriented row of fibers comprising a portion of the hexagonally shaped boundary of fibers. The additional row of fibers includes a horizontally oriented row of fibers, and the additional row of fibers is packed on top of the horizontally oriented boundary of fibers. A fiber of the horizontally oriented row of fibers of the boundary of fibers is packed adjacent to two consecutive fibers of the additional row of fibers, forming a triangular shape of fibers. The triangular shape of fibers forms a maximum open area ratio (OAR) of at least 90 percent.

Yet another embodiment of the present invention is a method of fabricating a boule for a multichannel plate (MCP). The method includes the steps of: (a) forming at least first and second stacks of multifibers, each stack having horizontal rows of fibers arranged in a symmetrical hexagonal configuration; (b) forming a single row of fibers on top of the first stack; and (c) placing the second stack on top of the single row of fibers.

Forming the single row of fibers includes stacking each fiber of the single row between two adjacent fibers of the top of the first stack. Placing the second stack includes adjusting the second stack so that a fiber of the second stack is disposed between two adjacent fibers of a single row of fibers.

Forming the at least first and second stacks includes packing fibers having cores and claddings into the horizontal rows of fibers arranged in the symmetrical hexagonal configuration. Packing fibers includes stacking one row of fibers on top of another row of fibers by placing a fiber of a row between two fibers of an adjacent lower row to form a triangular shape of fibers.

The method further includes the steps of: forming multiple stacks of multifibers, each stack having horizontally oriented fibers arranged in a symmetrical hexagonal configuration; arranging the stacks into a star pattern; and forming single horizontal rows of fibers on top of the stacks in the star pattern, respectively, before placing yet another stack on top of the stacks in the star pattern.

The method also includes the step of slicing the boule to form multiple MCPs.

It is understood that the foregoing general description and the following detailed description are exemplary, but are not restrictive, of the invention.

BRIEF DESCRIPTION OF THE FIGURES

The invention may best be understood from the following detailed description when read in connection with the following figures.

DETAILED DESCRIPTION OF THE INVENTION

Figure 5A:
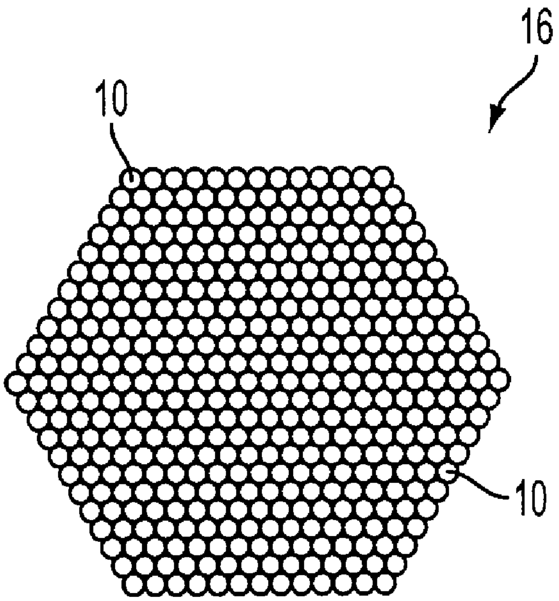
FIG. 5A (PRIOR ART)
FIGS. 5A and 5B depict a symmetrical hexagonally shaped multifiber (or bundle) forming triangular shapes of stacked fibers.
Figure 5B:
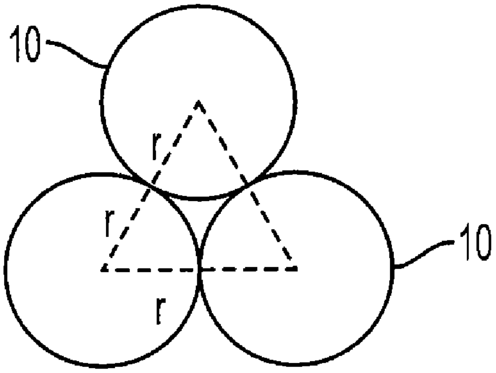
FIG. 5B (PRIOR ART)
Figure 6A:
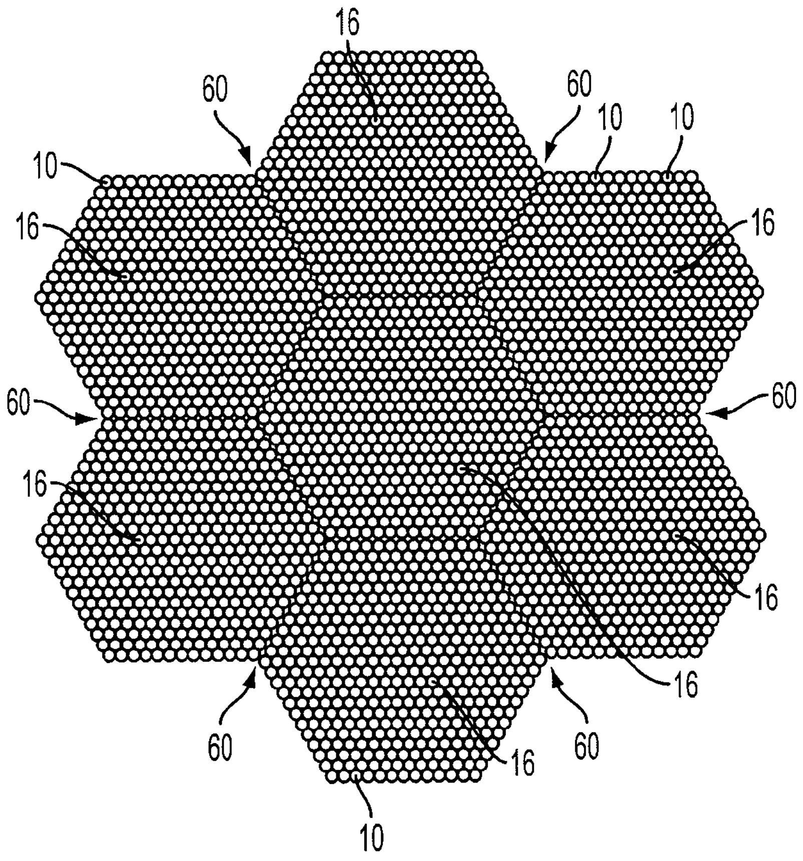
FIG. 6A (PRIOR ART)
FIGS. 6A and 6B depict multiple hexagonally shaped multifibers (or bundles), forming square shapes of stacked fibers at the boundary regions between adjacent multifibers (or bundles).
Figure 6B:
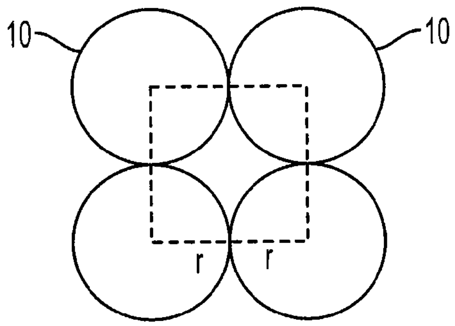
FIG. 6B (PRIOR ART)

The present invention relates to forming MCPs having an increased open area ratio (OAR) by using boules that are stacked with (a) bundles (or multilfibers) having symmetrical hexagonal patterns and (b) a single row of fibers added at a multiboundary region of each bundle. As will be explained, with the combination of (a) hexagonally arranged bundles and (b) an added single row of fibers for each bundle, the multiple horizontal rows of fibers in an MCP form a triangular shape of fibers (as shown in FIG. 5B). The square shape of fibers, shown in FIG. 6B, is minimized or eliminated.

Figure 1:
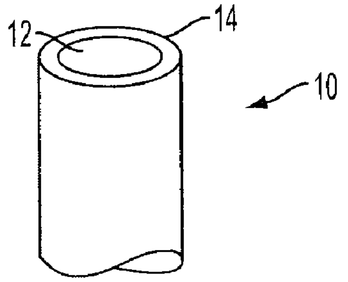
FIG. 1 PRIOR ART
FIG. 1 is a partial view of a fiber used in fabricating microchannel plates.
Figure 2:
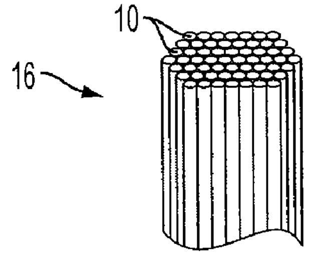
FIG. 2 PRIOR ART
FIG. 2 is a partial view of a bundle of fibers shown in FIG. 1 for use in fabricating microchannel plates.
Figure 7A:
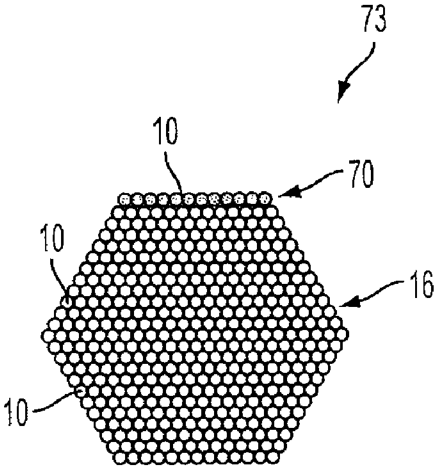
FIGS. 7A and 7B show an arrangement of fibers stacked in accordance with an embodiment of the present invention.
Figure 7B:
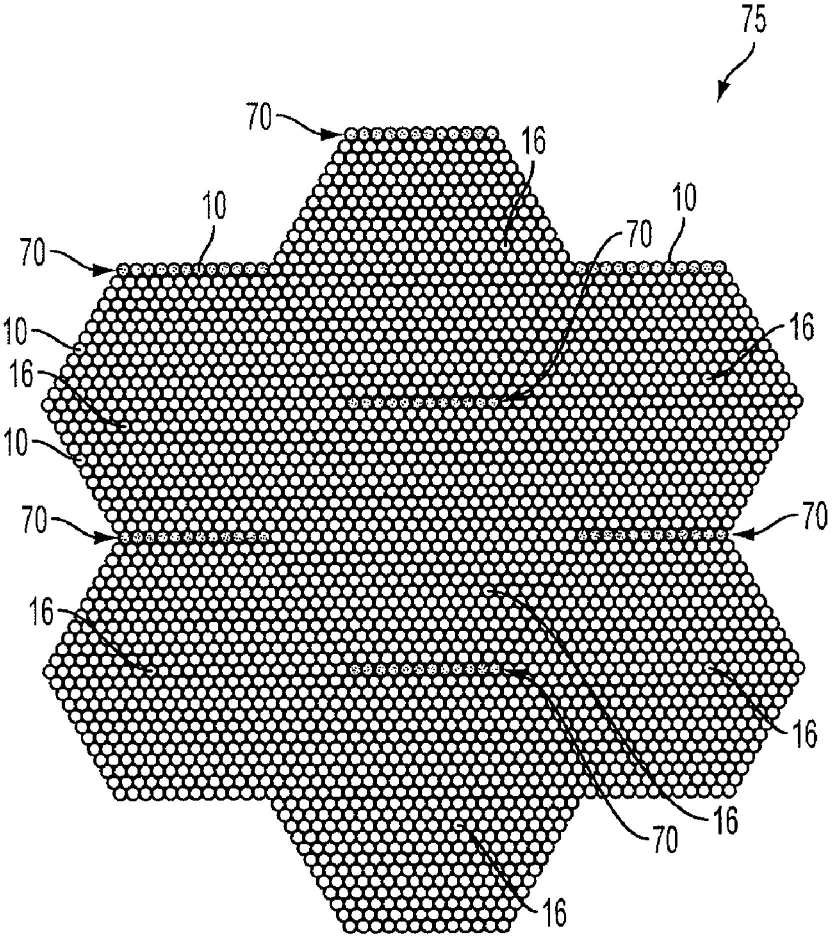

Referring to FIGS. 7A and 7B, there is shown an exemplary embodiment of the present invention. As shown, each bundle 16 includes multiple starting fibers 10 for an MCP. Starting fiber 10 includes glass core 12 and glass cladding 14 surrounding the core (shown in FIG. 1). Each bundle 16 includes a symmetrical hexagonal arrangement of fibers 10. The outer line of fibers (not labeled) forming the hexagonal perimeter of bundle 16 is referred to herein as a boundary of fibers. Disposed on each top row of the boundary of fibers, there is an additional one horizontal row of fibers, designated as 70. Whereas bundle 16 is a symmetric hexagonal pattern, when adding row 70 onto the top row of bundle 16, the packed arrangement of fibers becomes nonsymmetrical. The nonsymmetrical pattern of fibers is designated generally as 73 in FIG. 7A.

Referring next to FIG. 7B, there is shown an arrangement of multiple bundles 16, where each bundle 16 includes an additional single row 70 of fibers 10, in which the latter is packed upon the top row of fibers of each bundle 16. The nonsymmetrical pattern of fibers, shown in FIG. 7B, is generally designated as 75.

It will be appreciated that the pattern of fibers 75 is a beginning in the stacking of many more bundles 16 and many more single rows 70 required in the formation of a boule for an MCP, as described earlier with reference to FIGS. 3 and 4.

Figure 3:
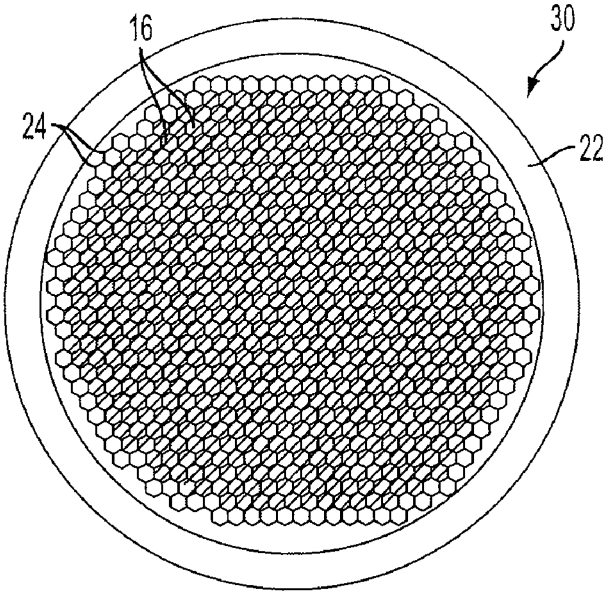
FIG. 3 PRIOR ART
FIG. 3 is a cross-sectional view of a packed boule.

As described with reference to FIG. 3, bundles 16 are positioned in glass tube 22. Several hundred bundles 16 are packed into the inner diameter bore of glass tube 22 A deviation from the structure shown in FIG. 3, however, is the packing of an additional, single horizontal row of fibers 70 on top of the horizontal boundary of fibers of each bundle 16, as shown in FIG. 7B.

Figure 4:
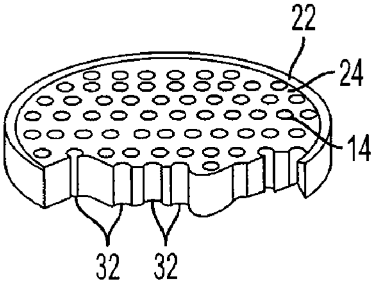
FIG. 4 PRIOR ART
FIG. 4 is a partial cut-away view of a microchannel plate.

As described with reference to FIGS. 3 and 4, each bundle 16 that forms the outermost layer of fibers in tube 22 is replaced by a support rod 24. This may be done by positioning one end of support rod 24 against one end of bundle 16 and then pushing support rod 24 against bundle 16, until bundle 16 is out of tube 22. The assembly formed when all of the outer bundles 16 have been replaced by support rods 24 is called a boule.

Boule 30 is fused together in a heating process to produce a solid boule of rim glass and fiber optics. The fused boule is then sliced, or diced, into thin cross-sectional plates. The planar end surfaces of the sliced fused boule, which maybe referred to as a wafer are ground and polished.

In order to form the microchannels, cores 12 of optical fibers 10 are removed, by etching with dilute hydrochloric acid. After etching the boule, the high lead content glass claddings 14 remains to form microchannels 32, as illustrated in FIG. 4. Also, support rods 24 remain solid and provide a good transition from the solid rim of tube 22 to microchannels 32.

Referring to FIGS. 7A and 7B, upon close examination, it will be observed that horizontal row 70 is packed on top of each top horizontal boundary row of bundle 16. Each fiber 10 of row 70 is placed to rest between two adjacent fibers 10 of the top horizontal boundary row of bundle 16. As such, all fibers 10, shown in configuration 73 and configuration 75, are packed to form triangular shapes of fibers, as shown in FIG. 5B. This configuration produces a maximum achievable OAR of 90.7%.

It will be appreciated that rows 70 have been shaded in gray for illustration purposes only. Once the bundles and the additional rows are stacked, the hexagonal close packing is maintained and all the rows of fibers 10 are arranged in the desired triangular shape of adjacent fibers. If the darkened shading is removed, it is hard to distinguish the interfaces (or the multiboundary regions). On the other hand, the multiboundary regions 60, shown in the conventionally packed bundles 16 of FIG. 6A, are easily discernible because of the resulting square shapes of rows of fibers at multiboundary regions 60.

Figure 8:
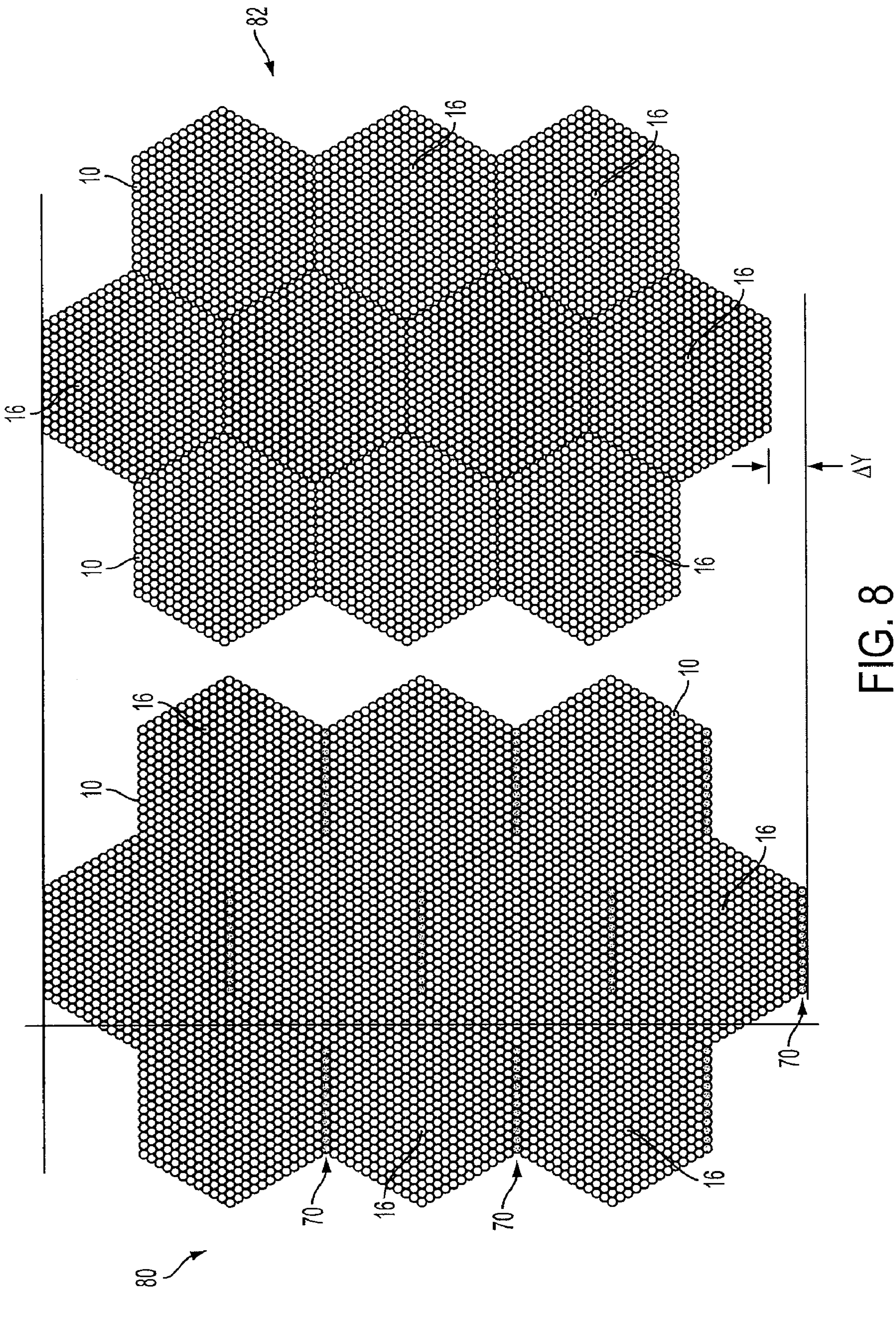
FIG. 8 shows a comparison between the height of an arrangement of fibers stacked in accordance with the present invention and an arrangement of fibers stacked in a conventional manner.

Referring lastly to FIG. 8, there is shown a height difference of $\Delta Y$ between configuration 80 of the present invention and configuration 82 formed by a conventional packing method. It will be appreciated that the orientation of fibers 10 may be controlled, so that the horizontal top boundary row of each bundle and its added single horizontal row are known as they are packed into glass tube 22.

If each row 70 is added to a boundary row of each bundle 16 prior to its insertion into glass tube 22, then orientation of the fibers may be controlled by simply marking the asymmetric face of the multifiber.

The present invention advantageously provides an MCP having a reduced noise figure and an increased signal/noise ratio, because of the increase in the achievable OAR. The present invention also achieves a reduced halo intensity (approximately ×2), because of the increase in the achievable OAR.

Although the stacking of bundles and their respective single additional rows have been described with respect to the formation of a circular MCP using glass tube 22 (FIG. 3), nevertheless the present invention is not intended to be limited to a circular MCP. Different sizes of MCPs and different shapes of MCPs may be formed by using different sizes and different shapes of glass receptacles to hold the fibers, as they are stacked into desired patterns.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A structure for a microchannel plate (MCP) comprising a plurality of multifibers, each multifiber having rows of fibers arranged in a symmetrical hexagonal configuration, each hexagonal configuration having a boundary, and a plurality of single rows of fibers, in addition to the plurality of multifibers, wherein each single row is disposed along a respective boundary of a multifiber, the single row of fibers is disposed between two adjacent boundary rows of multifibers, and a fiber of the single row is packed between two fibers of one of the two adjacent rows of multifibers, and between two fibers of the other one of the two adjacent rows of mutifibers, forming triangular shapes of fibers.

2. The structure of claim 1 wherein a multifiber and a single row of fibers, the latter disposed along the respective multifiber, form an asymmetrical hexagonal arrangement of fibers.

3. The structure of claim 1 wherein each multifiber includes a first row of fibers packed along a second row of fibers, and a fiber of the first row is packed adjacent to two fibers of the second row, forming a triangular shape of fibers.

4. The structure of claim 1 wherein each multifiber includes a row of boundary fibers forming the respective boundary, and a fiber of a single row of fibers is packed adjacent to two fibers of the boundary fibers, forming a triangular shape of fibers.

5. The structure of claim 4 wherein the triangular shape of fibers forms a maximum open area ratio (OAR) of at least 90 percent.

6. The structure of claim 1 wherein the rows of fibers include core fibers and cladding fibers, wherein the cladding fibers surround the core fibers.

7. The structure of claim 1 wherein the plurality of single rows of fibers and the plurality of multifibers are configured to form a boule, and the boule is configured for dicing during fabrication of the MCP.

8. A boule for making a multichannel plate (MCP) comprising at least two sets of rows of fibers, each set arranged to form a hexagonally shaped boundary of fibers, and an additional row of fibers disposed between the two sets of hexagonally shaped boundary of fibers, wherein each set includes a horizontally oriented row of fibers comprising a portion of the hexagonally shaped boundary of fibers, the additional row of fibers includes a horizontally oriented row of fibers, and the additional row of fibers is packed on top of the horizontally oriented boundary of fibers.

9. The boule of claim 8 wherein a fiber of the horizontally oriented row of fibers of the boundary of fibers is packed adjacent to two consecutive fibers of the additional row of fibers, forming a triangular shape of fibers.

10. The boule of claim 9 wherein the triangular shape of fibers forms a maximum open area ratio (OAR) of at least 90 percent.

11. The boule of claim 8 wherein the other horizontally oriented row of fibers of the other set of the at least two sets is packed on top of the additional row of fibers forming another triangular shape of fibers.

12. The boule of claim 8 including multiple sets of fibers, each set including a boundary row of horizontally oriented fibers, and a plurality of additional rows of fibers, each additional row of fibers packed on top of a respective boundary row of horizontally oriented fibers.

13. A method of fabricating a boule for a multichannel plate (MCP) comprising the steps of:

forming at least first and second stacks of multifibers, each stack having horizontal rows of fibers arranged in a symmetrical hexagonal configuration, forming a single row of fibers on top of the first stack, and placing the second stack on top of the single row of fibers.

14. The method of claim 13 wherein forming the single row of fibers includes stacking each fiber of the single row between two adjacent fibers of the top of the first stack, and placing the second stack includes adjusting the second stack so that a fiber of the second stack is disposed between two adjacent fibers of the single row of fibers.

15. The method of claim 13 wherein forming the at least first and second stacks includes packing fibers having cores and claddings into the horizontal rows of fibers arranged in the symmetrical hexagonal configuration.

16. The method of claim 13 wherein packing fibers includes stacking one row of fibers on top of another row of fibers by placing a fiber of a row between two fibers of an adjacent lower row to form a triangular shape of fibers.

17. The method of claim 13 including the step of:

slicing the boule to form multiple MCPs.

* * * * *